March 31, 1964    J. McEWAN    3,126,675
LAWN MOWER SHARPENER
Original Filed Jan. 2, 1959    2 Sheets-Sheet 1
FIG_1
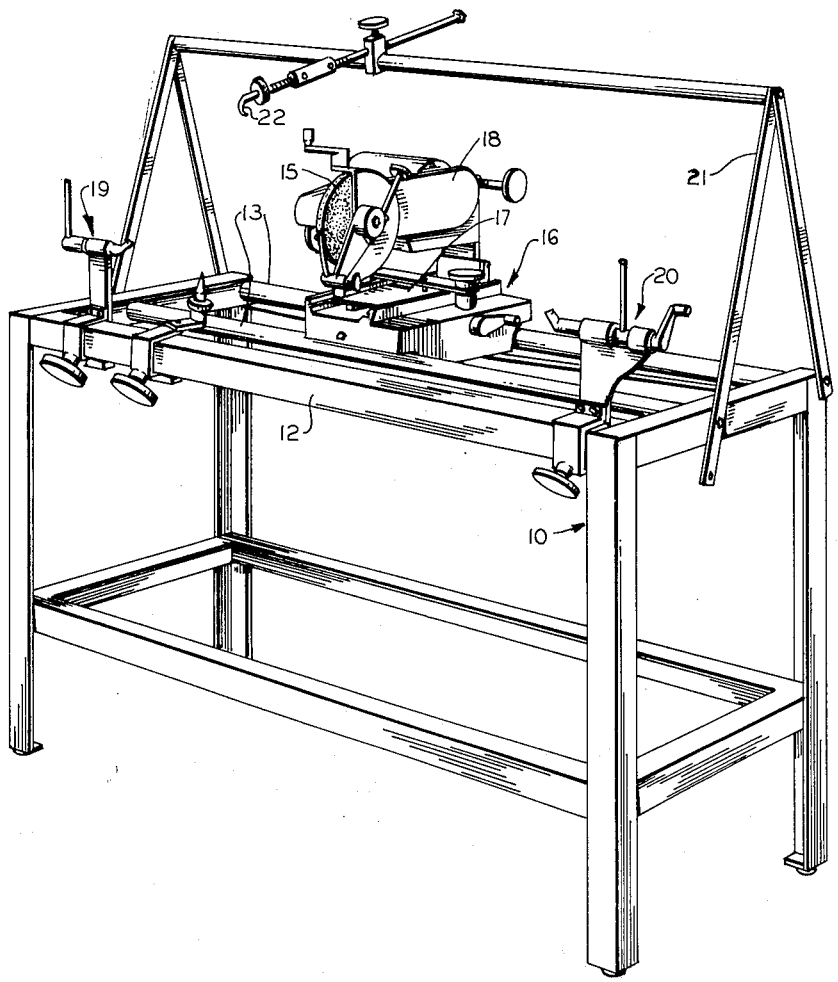
INVENTOR.
JAMES McEWAN
BY *Allen and Chromy*
ATTORNEYS

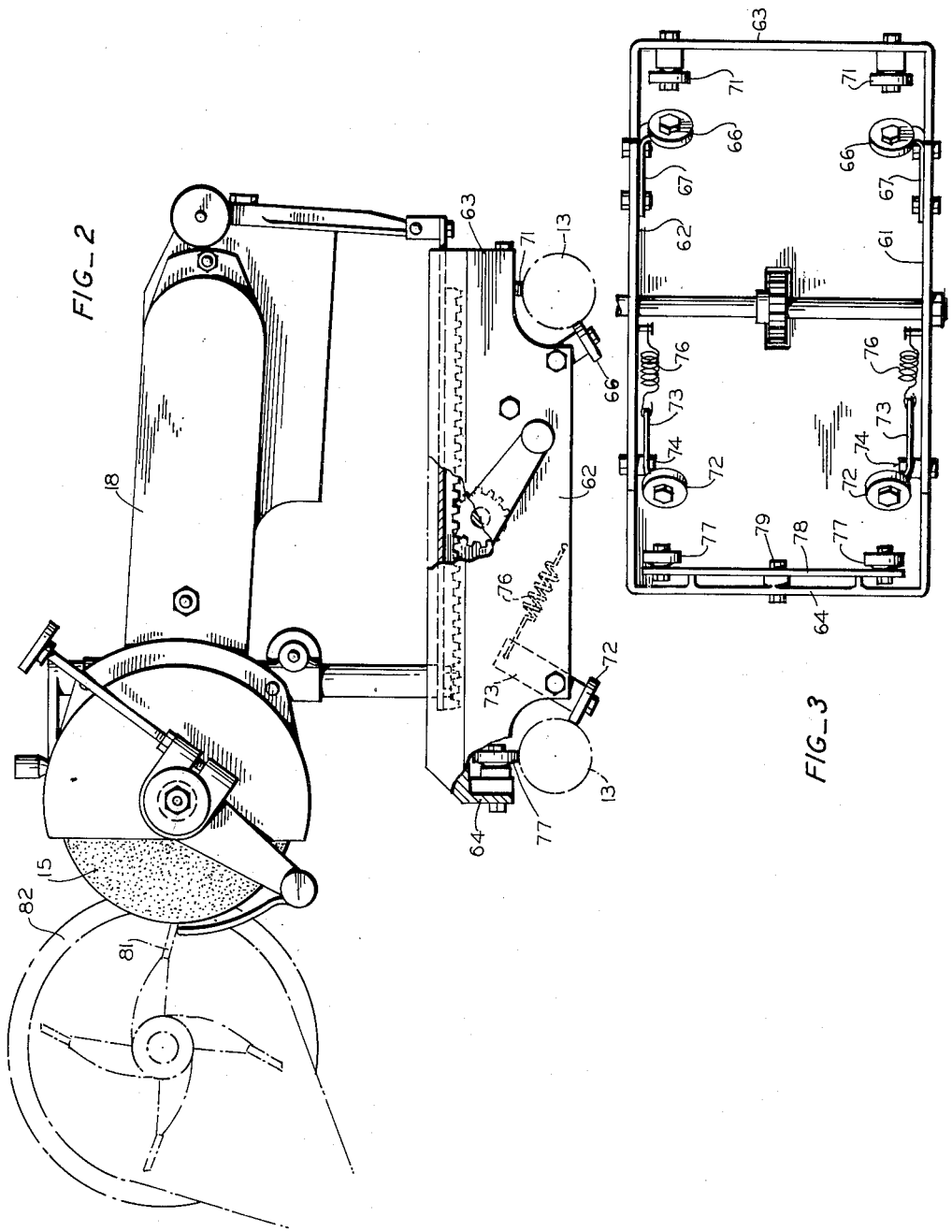

United States Patent Office 3,126,675
Patented Mar. 31, 1964

3,126,675
LAWN MOWER SHARPENER
James McEwan, 138 Stockton, San Jose, Calif.
Original application Jan. 2, 1959, Ser. No. 784,782. Divided and this application Feb. 19, 1962, Ser. No. 173,923
4 Claims. (Cl. 51—48)

The present invention relates to lawn mower sharpeners, it is concerned more particularly with an improved grinding wheel mount or carriage which provides an effective sharpening action with ease of operation.

This application is a division of my co-pending application Serial No. 784,782, filed January 2, 1959.

It is a general object of the invention to provide lawn mower sharpeners having a carriage which is mounted to be steady while doing grinding and to insure alignment of the carriage rollers on the supporting rails.

Still another object of the invention is to provide a lawn mower sharpener in which the carriage carrying a grinding wheel is mounted in desirable fashion to provide for sliding movement on the frame in accurately aligned fashion.

A further object of the invention is to provide a grinding wheel carriage mount in a lawn mower sharpener which mount does not require individual adjustment and alignment of certain of the wheels on which the carriage is mounted.

Other objects and advantages of the invention will be apparent from the following description of a preferred embodiment thereof, as illustrated in the accompanying drawings, in which:

FIG. 1 is a perspective view of a lawn mower sharpener embodying the invention;

FIG. 2 is an enlarged side elevational view of the grinding head and its carriage with certain portions broken away and shown in sections to illustrate details of construction;

FIG. 3 is a bottom plan view of the grinding wheel carriage.

Referring to FIG. 1, the mower sharpener includes a rectangular frame 10 of welded construction having a front rectangular cross bar 12, and rearwardly of the front cross bar 12 there are a pair of cylindrical cross bars 13. The cross bars 13 carry for transverse sliding movement thereon a carriage 16 upon which is mounted a slide plate 17 which carries for adjustment thereon a grinder head 18 including a grinding wheel 15. The front square bar 12 has adjustably mounted thereon a head stock 20, and a tail stock 19. The frame also carries an A-frame structure 21 adjustably mounted thereon and carrying a hook 22 forming part of the three-point mounting for the lawn mower.

As previously described, the carriage 16 (FIGS. 2 and 3) provides a mounting for the grinding head 18 and its grinding wheel 15 and is mounted for sliding movement on the cylindrical cross bars 13. This carriage 16 is generally of rectangular construction, and has downwardly projecting side flanges 61 and 62 and end flanges 63 and 64. The side flanges 61 and 62 carry a pair of fixed rollers 66, carried by bent arms 67 suitably bolted on the flanges 61 and 62, and opposed to a pair of rollers 71 carried on an adjacent end wall 63. The side flanges 61 and 62 also carry a pair of movable rollers 72, each carried by a bent arm 73 pivoted at 74 on the adjacent flange 61 or 62 and connected at one end to a tension spring 76, also connected to the adjacent flange of the carriage. The spring 76 urges the associated arm 73 to engage the roller 72 against the adjacent bar 13 as seen in FIG. 2. The provision of the spring-urged rollers 72 provide for movement of these rollers to a withdrawn position to allow insertion of the carriage in the place as seen in FIG. 2, and thereafter when released the rollers 72 positively engage the adjacent bar 13 to hold the carriage securely in place. These rollers 72 also accommodate any variations of the cross bars or pipes 13, and urge all the rollers into engagement therewith. It will be noted that the rollers 77 cooperating with the rollers 72, are journaled on an arm or rocking bar 78 which is pivoted intermediate its ends at 79 on the adjacent flange 64 of the carriage. In this way in effect a three-point mounting of the top rollers is provided, this pivoted roller structure providing resilience with stability and in cooperation with the spring-urged rollers helps the carriage to travel smoothly and evenly on the rails in spite of any slight misalignment of same.

Referring to FIG. 2, it will be noted that during the sharpening operation wherein the grinding wheel 15 is engaged with a blade 81 of the lawn mower 82, the thrust produced by this engagement is transmitted through the grinding wheel, the grinding head and the carriage frame and through the rollers 71, 66 and 77 to the rails or pipes 13. The spring-urged rollers 72 take no part of this thrust as they are not in the line of thrust-transmitting parts. Therefore, as the carriage is moved along the rails 13 in performing the grinding operation, all the rollers can remain in close rolling contact with their cooperating rails or rail under the influence of the springs 76 and the thrust and a firm smooth even movement of the carriage over the rails will be effected.

While I have shown and described a preferred form of the invention, it is evident that the invention, is capable of modification and variation from the form shown so that the scope thereof should be limited only by the scope of the claims appended hereto.

I claim:

1. In a lawn mower sharpener having a pair of parallel cross bars, and a carriage for a grinding wheel mounted thereon, mounting means for said carriage comprising a rectangular frame carrying roller means for engagement with each of said cross bars, the roller means positioned toward the grinding wheel of said lawn mower sharpener having a fixed journal means on said frame, and another of said roller means having journal means resiliently connected to said frame, one of said roller means engaging the associated cross bar below the center line of the bar to lock the carriage in place yieldably.

2. In a lawn mower sharpener having a pair of parallel cross bars, and a carriage for a grinding wheel mounted for movement thereon, mounting means for said carriage comprising a frame carrying at least two pairs of rollers for engagement with each of said cross bars, the rollers positioned in the line of thrust from the grinding wheel to the cross bars having fixed journal means on said frame, a rocking bar carrying a pair of the above-named rollers and having a fixed journal means on the frame, and a plurality of rollers disposed out of the line of thrust and resiliently connected to said frame and being disposed in cooperative spaced relation with said rollers carried by said rocking bar to engage the same cross bar.

3. In a lawn mower sharpener having a pair of parallel cross bars, and a carriage for a grinding wheel mounted for movement thereon, mounting means for said carriage comprising a frame carrying roller means for engagement with each of said cross bars, the roller means positioned in the line of thrust from the grinding wheel to the cross bars having fixed journal means on said frame, a rocking bar carrying a pair of the above-named roller means and having a fixed journal means on the frame, and at least one of said roller means being disposed out of the line of thrust and resiliently connected to said frame and being disposed in cooperative spaced relation with said roller means carried by said rocking bar to engage the same cross bar.

4. In a lawn mower sharpener having a pair of parallel cross bars, and a carriage for a grinding wheel mounted for movement thereon, mounting means for said carriage comprising a frame carrying a plurality of roller means for engagement with each of said cross bars, certain of said roller means being positioned in the line of thrust from the grinding wheel to the cross bars and having fixed journal means, rocking means carrying a pair of the above named roller means and having a fixed journal means on the frame, and another of said roller means disposed out of the line of thrust and resiliently connected to said frame and being in cooperative spaced relation with said roller means carried by said rocking bar to engage the same cross bar.

References Cited in the file of this patent

UNITED STATES PATENTS

| | | |
|---|---|---|
| 2,466,905 | Machovec | Apr. 12, 1949 |
| 2,552,994 | Montey | May 15, 1951 |
| 2,627,142 | Pickel | Feb. 3, 1953 |
| 2,718,097 | Bradley | Sept. 20, 1955 |
| 2,777,258 | Avra | Jan. 15, 1957 |
| 2,879,629 | Machovec | Mar. 31, 1959 |